US012060736B2

(12) United States Patent
Konrad et al.

(10) Patent No.: US 12,060,736 B2
(45) Date of Patent: Aug. 13, 2024

(54) VEHICLE DOOR FOR A MOTOR VEHICLE

(71) Applicant: DAIMLER AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 293 days.

(21) Appl. No.: 17/597,255

(22) PCT Filed: Jun. 25, 2020

(86) PCT No.: PCT/EP2020/067910
§ 371 (c)(1),
(2) Date: Dec. 30, 2021

(87) PCT Pub. No.: WO2021/001263
PCT Pub. Date: Jan. 7, 2021

(65) Prior Publication Data

US 2022/0316242 A1 Oct. 6, 2022

(30) Foreign Application Priority Data

Jul. 3, 2019 (DE) .................... 10 2019 004 691.9

(51) Int. Cl.
*E05B 79/06* (2014.01)

(52) U.S. Cl.
CPC .................................. *E05B 79/06* (2013.01)

(58) Field of Classification Search
CPC .......... E05B 79/06; E05B 85/16; E05B 85/18
See application file for complete search history.

(56) References Cited

U.S. PATENT DOCUMENTS 11,214,990 B2 * 1/2022 Yoshino ................. E05B 79/06
2018/0051492 A1 2/2018 Smith

FOREIGN PATENT DOCUMENTS

CN 107636241 A 1/2018
CN 208393056 U 1/2019
DE 3203885 A1 9/1983
DE 3630406 A1 3/1988
(Continued)

OTHER PUBLICATIONS

International Search Report mailed Oct. 15, 2020 in related/corresponding International Application No. PCT/EP2020/067910.
(Continued)

*Primary Examiner* — Kristina R Fulton
*Assistant Examiner* — Thomas L Neubauer
(74) *Attorney, Agent, or Firm* — PATENT PORTFOLIO BUILDERS PLLC

(57) ABSTRACT

A vehicle door for a motor vehicle has a support part arranged on an inside of a covering of the vehicle door. An outer door handle is arranged on an outside of the covering for actuating the vehicle door. The outer door handle is fixed on the support part. An elevation is provided on the support part on a fixing side of the support part facing towards the covering for forming a positioning aid. The elevation is received in the vehicle door in an aperture in the covering tailored to the elevation. Here, the support part and the covering are tailored to each other in such a way that they are connected to each other in a form fit manner in at least one form fit zone.

12 Claims, 2 Drawing Sheets

(56) References Cited

FOREIGN PATENT DOCUMENTS

Figure 1:
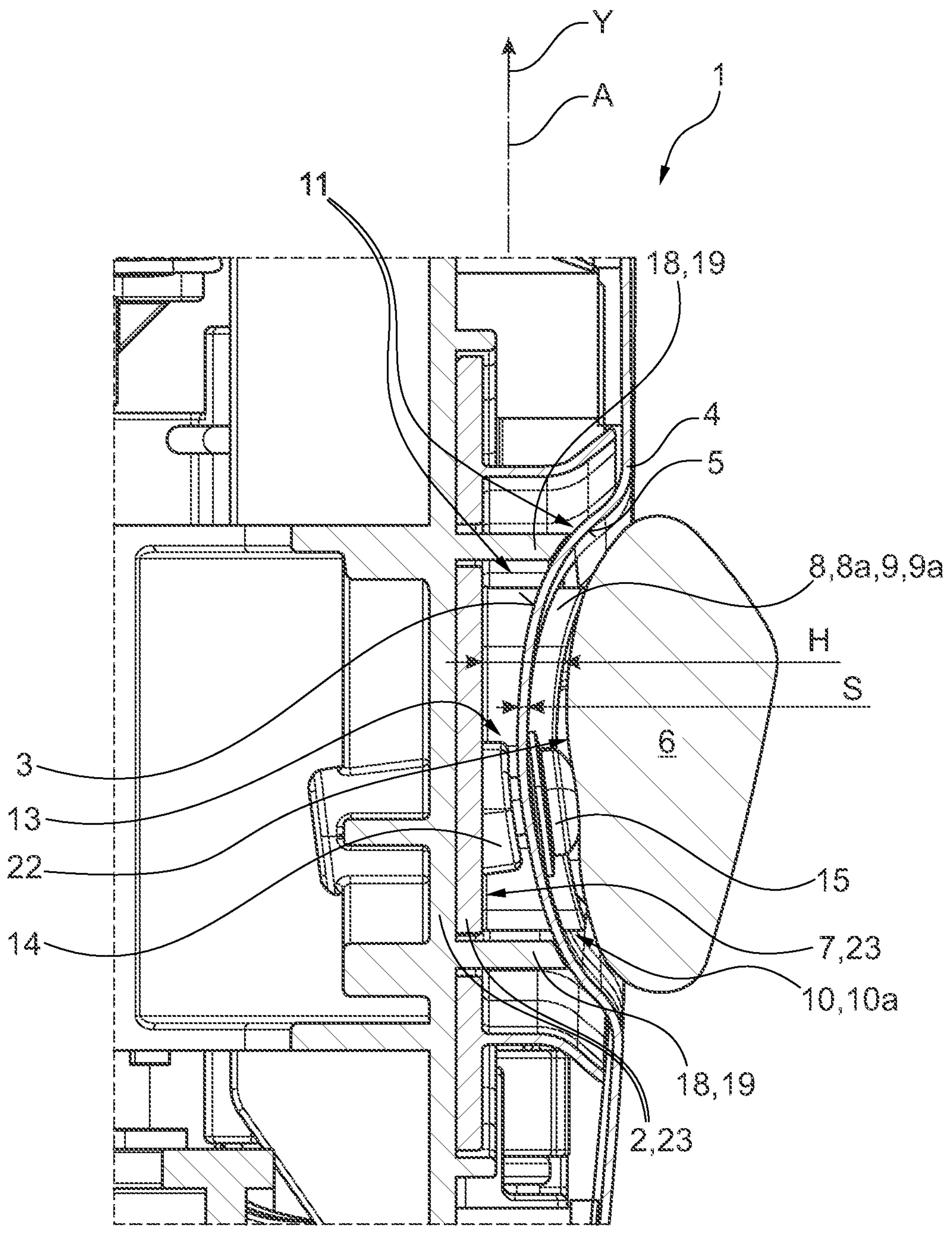

| | | | |
|---|---|---|---|
| DE | 10222289 | A1 | 11/2003 |
| DE | 102012020707 | A1 | 5/2013 |
| DE | 102017118623 | A1 | 2/2018 |
| EP | 1026349 | A1 | 8/2000 |
| EP | 1057671 | A2 | 12/2000 |
| EP | 1437461 | A2 | 7/2004 |
| EP | 1801331 | A1 | 6/2007 |
| JP | 2000238537 | A | 9/2000 |

OTHER PUBLICATIONS

Office Action created Feb. 20, 2020 in related/corresponding DE Application No. 10 2019 004 691.9.

Written Opinion mailed Oct. 15, 2020 in related/corresponding International Application No. PCT/EP2020/067910.

Office Action dated Jun. 2, 2022 in related/corresponding CN Application No. 202080048927.6.

* cited by examiner

VEHICLE DOOR FOR A MOTOR VEHICLE

BACKGROUND AND SUMMARY OF THE INVENTION

Exemplary embodiments of the invention relate to a vehicle door for a motor vehicle, a modular construction system for such a vehicle door, and a motor vehicle having at least one such vehicle door according to the invention.

Motor vehicles usually have vehicle doors by means of which a vehicle interior chamber of the motor vehicle can be opened or closed for occupants to get in or out and/or for loading and unloading. An outer door handle is often present on such vehicle doors, which serves to actuate the vehicle door. Upon such an actuation of the vehicle door by means of the outer door handle, a locking device of the vehicle door can be unlocked when opening the vehicle door. The outer door handle usually serves to transfer an actuation force that has to be applied to the vehicle door by an operator for unlocking the locking device of the vehicle door and for opening or closing the vehicle door. Here, this actuation force is introduced into a covering of the vehicle door via a fixing of the outer door handle.

DE 36 30 406 A1 discloses a vehicle door having an outer door handle for actuating the vehicle door that can be mounted on a covering of a vehicle door by means of a fixing flange present on the outer door handle. A central aperture is provided in the covering, through which the outer door handle mounted from an inside of the covering protrudes outwardly, wherein the fixing flange of the outer door handle is fixed in a force-fit manner on the inside of the covering by means of a screw connection.

Here, it can be considered as disadvantageous that such an outer door handle can be positioned only insufficiently accurately on the covering of the vehicle door when mounting the vehicle door, such that a separate aligning step is necessary for precisely aligning the position of the door handle.

Moreover, the actuation force when actuating the outer door handle to unlock a locking device of the vehicle door or for opening or closing the vehicle door can only be transferred in a force-fit manner to the covering of the vehicle door, which is why the screw connection fixing the outer door handle and the covering have to be designed very robustly. The force introduction of the actuation force is here carried out via very small contact surfaces, which can negatively result in load peaks in the covering and on the door handle.

Exemplary embodiments of the present invention are directed to new ways for vehicle doors and for a modular construction system for such a vehicle door and for a motor vehicle having such a vehicle door—in particular for eliminating the disadvantages mentioned above.

Accordingly, the basic idea of the invention is to design a vehicle door for a motor vehicle having a support part arranged in a form-fit manner on the inside on a covering of the vehicle door, on which support part an outer door handle can be fixed for actuating the vehicle door on an outside of the covering. Here, a positioning aid is provided on the support part, by means of which positioning aid a position of the support part on the covering and thus also the position of the outer door handle outside on the covering is precisely ensured by means of a form-fit between the support part and the covering.

Advantageously, this form-fit connection of the support part to the covering makes it possible for the support part to be positioned particularly accurately on the covering, whereby the outer door handle fixed on the support part is, in turn, also positioned particularly accurately on the covering. Thus, a separate aligning step for aligning the door handle on the covering when mounting the vehicle door can be avoided, which directly results in cost advantages. Moreover, an actuation force applied to the outer door handle by an operator for actuating the vehicle door can be introduced into the covering in an improved way by means of the form-fit formed between the support part and the covering.

A vehicle door according to the invention for a motor vehicle comprises a support part arranged on an inside of a covering of the vehicle door. Moreover, the vehicle door has an outer door handle for actuating the vehicle door, which is arranged on an outside of the covering and which is fixed on the support part. On the support part, a (first) elevation is provided on a fixing side of the support part facing towards the covering, by means of which elevation a positioning aid is formed for positioning the support part in relation to the covering. The (first) elevation is received in a (first) aperture in the covering, the aperture being tailored to the (first) elevation. Here, the support part and the covering are tailored to each other in such a way that they are connected to each other in a form-fit manner in at least one form-fit zone. It emerges from this that the support part can be fixed particularly accurately on the covering in its form-fit position in relation to the covering, which translates directly to a positional accuracy of the door handle fixed on the support part. This means that a separate aligning step for aligning the outer door handle in relation to the covering can be spared. Moreover, the actuation force applied to the outer door handle by the operator can be introduced into the covering with particularly good distribution when unlocking a locking device of the vehicle door or when opening or closing the vehicle door, as a result of the form-fit between the support part and the covering. Thus, unwanted load peaks in the covering of the vehicle door when actuating the vehicle door can be effectively avoided or at least reduced.

A second elevation is expediently provided on the support part on the fixing side of the support part facing away from the covering, the second elevation forming a second positioning aid. This second elevation is received in a second aperture in the covering tailored to the second elevation. The positional accuracy of the support part in relation to the covering can be advantageously improved by means of such an additional second positioning aid, which also has a direct advantageous effect on the positional accuracy of the outer door handle fixed on the support part in relation to the covering.

In an advantageous development of the vehicle door, the (first and/or second) aperture in the covering comprises a slot section. The support part is releasably fixed on the covering in this slot section by means of a screw connection. Advantageously, this screw connection holds the support part in its form-fit position on the covering, such that a particularly effective force transfer of the actuation force from the door handle via the support part into the covering is made possible.

A further advantageous development of the vehicle door provides that a screw receiver for forming the screw connection is provided in the first elevation of the support part. A hook element is provided on the second elevation, the hook element having an undercut. This hook element with the undercut engages through the second aperture of the covering, such that the undercut abuts on the outside of the covering. Advantageously, the support part can thus be held in its form-fit position on the covering with only a screw connection. This offers a particularly cost-effective possibility of holding the support part in its form-fit position.

A protrusion is preferably provided on the fixing side of the support part, which protrusion serves as a support foot. This protrusion abuts on the inside of the covering for the form-fit force introduction in the form-fit zone. Advantageously, a particularly good form fit can be formed between the support part and the inside of the covering in the form fit zone by means of such a protrusion.

At least two protrusions are particularly preferably provided on the fixing side of the support part, the protrusions forming support feet. These at least two protrusions abut on the inside of the covering for the form-fit force introduction in the form-fit zone. Here, the first and/or second elevation of the support part is arranged between the two protrusions in a direction set by an actuation axis of the outer door handle. This direction running on the actuation axis of the outer door handle preferably runs substantially vertically in a mounted state of the vehicle door on a motor vehicle. A particularly consistent introduction of the actuation force applied by an operator and acting on the outer door handle into the covering is carried out by means of several such protrusions for form-fit force introduction into the covering.

According to a further advantageous development of the vehicle door, the first and/or second elevation of the support part extends beyond an elevation height. This elevation height of the elevation is greater than or equal to a covering thickness of the covering in this development. Here, the elevation height is measured from the fixing side of the support part in the direction of the covering. The covering thickness of the covering corresponds to a spacing between the inside and the outside of the covering. The covering can expediently be a sheet made of a metal or a plate-like product made of a plastic which, particularly expediently, can be fiber-reinforced. The covering strength then corresponds to a sheet strength or a plate strength of the sheet or the plate-like product, from which the covering is produced. Preferably, the elevation height and the covering thickness are tailored to each other in such a way that the (first and/or second) elevation is received in the (first and/or second) aperture via the total covering thickness of the covering. Advantageously, this enables a particularly reliable positioning of the support part in relation to the covering.

A further advantageous development of the vehicle door provides that a centering element is present on the (first and/or second) elevation of the support part, by means of which centering element a gripping positioning aid is formed. The outer door handle is centered in relation to the support part by means of this centering element. Advantageously, it can thus be achieved that the increased positional accuracy of the support part achieved by means of the first and/or second positioning aid of the support part are transferred particularly well to the outer door handle. Accordingly, the outer door handle can be positioned particularly precisely on the covering by means of the centering element provided on the support part.

Moreover, the invention relates to a modular construction system for a vehicle door corresponding to the preceding description. The modular construction system for the vehicle door comprises an outer door handle pool which has a plurality of outer door handles. Moreover, the modular construction system comprises a covering pool which comprises a plurality of coverings. Furthermore, the modular construction system for the vehicle door comprises a support part on which each outer door handle of the outer door handle pool can be fixed for fixing via a gripping fixing interface that is substantially the same for all outer door handles of the outer door handle pool. The support part can be fixed on each of the coverings of the covering pool via a support part fixing interface that is substantially the same for all coverings of the covering pool. Thus, each individual door handle of the outer door handle pool can be fixed on each individual covering of the covering pool by forming the vehicle door by means of the support part. Advantageously, such a modular construction system makes it possible to achieve a very great variety of variants of a vehicle door, in which different kinds of coverings of the covering pool having different kinds of outer door handles of the outer door handle pool can be combined with one another via a scalable support part and scalable interfaces.

Furthermore, the invention relates to a motor vehicle comprising at least one vehicle door according to the description above, which is mounted on a bodywork of the motor vehicle. Expediently, the motor vehicle comprises two such vehicle doors. Particularly expediently, the motor vehicle comprises four or five such vehicle doors. The vehicle door or the vehicle doors of the motor vehicle is/are preferably based on a modular construction system as described above. The features mentioned above for a vehicle door according to the invention and for a modular construction system according to the invention can also be transferred analogously to a motor vehicle having such a door which is based, in particular, on such a modular construction system.

Further important features and advantages of the invention emerge from the sub-claims, from the drawings and from the corresponding description of the figures by means of the drawings.

It is understood that the features mentioned above and still to be explained below can be used not only in the respectively specified combination, but also in other combinations or on their own without leaving the scope of the present invention.

Preferred exemplary embodiments of the invention are depicted in the drawings and are explained in more detail in the description below, wherein the same reference numerals relate to identical or similar or functionally identical components.

BRIEF DESCRIPTION OF THE DRAWING FIGURES

Figure 2:
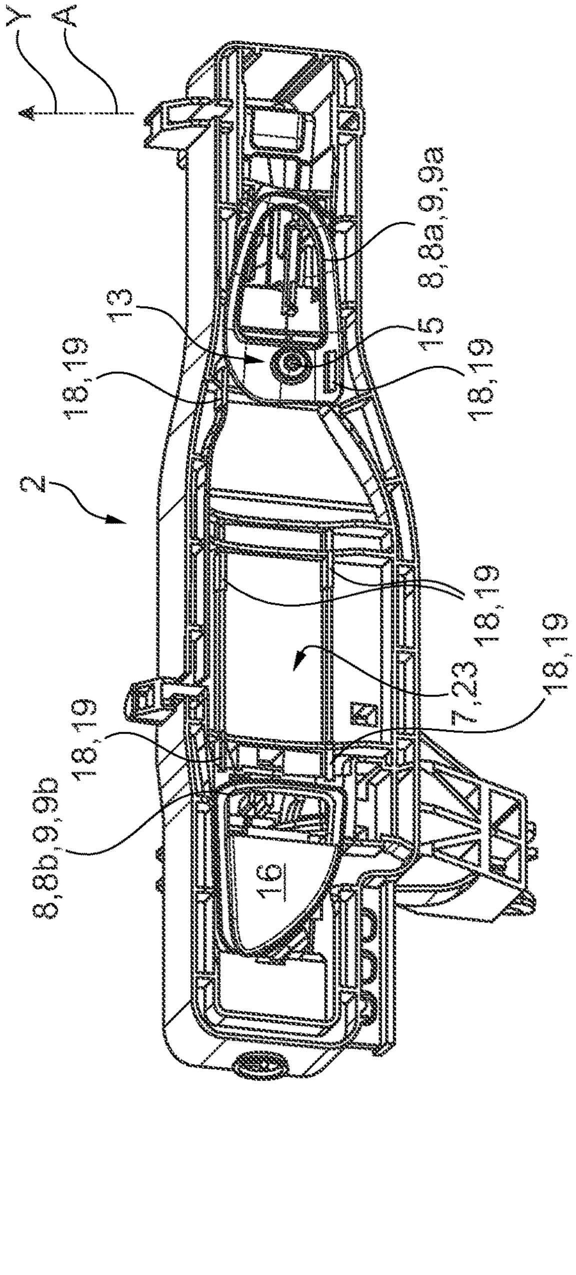
Figure 3:
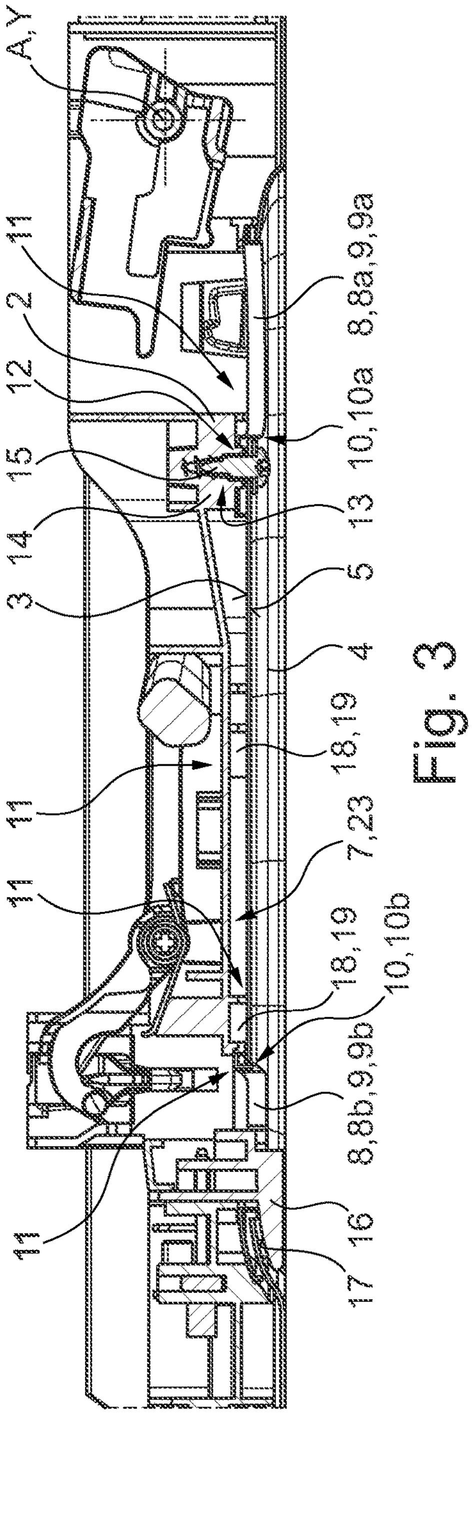

Here are shown, schematically in each case:

FIG. 1, by way of example, a vehicle door according to the invention in a section in parallel to an actuation axis of an outer door handle, FIG. 2 an example of a support part of a vehicle door according to the invention in a perspective depiction, FIG. 3, by way of example, a support part, fixed on a covering of a vehicle door according to the invention, of the vehicle door according to the invention in a section transverse to the actuation axis of an outer door handle of the vehicle door.

DETAILED DESCRIPTION

FIG. 1 shows an example of a vehicle door 1 according to the invention for a motor vehicle in a section in parallel to an actuation axis A of an outer door handle 6 of the vehicle door 1. The outer door handle 6 serves to actuate the vehicle door 1. Here, such an actuation of the vehicle door 1 is to be understood as opening and/or closing the vehicle door. Locking or unlocking a door lock of the vehicle door 1 can also be seen as such an actuation. In principle, each introduction of an actuation force into the outer door handle 6 can be understood by an operator as such an actuation.

According to FIG. 1, the vehicle door 1 comprises a covering 4, on which the outer door handle 6 is arranged on an outside 5 of the covering 4. The vehicle door 1 moreover comprises a support part 2, which is arranged on an inside 3 of the covering 4 and on which the outer door handle 6 is fixed. In a motor vehicle having a vehicle door 1 according to the invention, the inside 3 of the covering 4 can face towards a vehicle interior chamber and the outside 5 of the covering 4 can correspondingly face towards an outer surroundings of the motor vehicle. The support part 2 has a fixing side 7 facing towards the covering 4. A first elevation 9, 9*a* is provided on this fixing side 7 of the support part 2, the elevation forming a first positioning aid 8, 8*a*. This first elevation 9, 9*a* is received in the vehicle door 1 in a first aperture 10, 10*a* of the covering 4. Here, the first aperture 10, 10*a* is tailored to this first elevation 9, 9*a* for receiving the first elevation 9, 9*a*. The support part 2 and the covering 4 are tailored to each other in such a way that they are connected to each other in a form-fit zone 11 in a form-fit manner. The support part 2 can accordingly abut on the covering 4 thus forming a form fit.

As illustrated by means of FIGS. 2 and 3, a second elevation 9*b* can be provided on the fixing side 7 of the support part 2 facing towards the covering 4, with which elevation a second positioning aid 8*b* is formed. A second aperture 10*b* can be present in the covering 4 of the vehicle door 1. The second elevation 9*b* of the support part 2 can be received in the vehicle door 1 in the second aperture 10*b* of the covering 4. The second aperture 10*b* in the covering 4 can here be tailored to the second elevation 9*b*.

As illustrated in FIG. 3, the aperture 10 in the covering 4 comprises a slot section 12. Here, the first aperture 10*a* and/or the second aperture 10*b* can comprise such a slot section 12. According to the example shown in FIG. 3, however, only the first aperture 10*a* can also comprise such a slot section 12. In this slot section 12, the support part 2 can be releasably fixed on the covering 4 by means of a screw connection 13. To form this screw connection 13, a screw receiver 14 can be present on the support part 2 on the first elevation 9*a*. The screw receiver 14 can expediently be designed as a screw boss into which a screw 15 can be screwed. Here, the screw receiver 14 can have a female thread tailored to a male thread of the screw 15. Alternatively, the screw 15 can also be a self-tapping screw which generates the female thread in the screw receiver 14 when screwing in the screw 15 itself.

Corresponding to the examples of FIGS. 2 and 3, the screw receiver 14 is provided on the first elevation 9*a* of the support part 2 to form the screw connection 13. A hook element 16 is arranged on the second elevation 9*b*, the hook element having an undercut 17. The hook element 16 engages in the vehicle door 1 through the second aperture 10*b* in such a way that the undercut 17 abuts on the outside 5 of the covering 4. This means that the support part 2 can be held on the inside 3, on the one hand, by means of the hook element and, on the other hand, by means of the screw connection 13 in such a way that the form fit is formed.

As illustrated in FIGS. 1 to 3, a protrusion 19 can be provided on the fixing side 7 of the support part 2. A support foot 18 can be formed by means of this protrusion 19.

As shown in FIG. 1 and FIG. 3, the protrusion abuts on the inside 3 of the covering 4 in the form-fit zone 11. In particular, the protrusion 19 can abut on the inside 3 of the covering 4 in such a way that a form-fit force introduction by the support part 2 into the covering 4 is ensured in the form-fit zone 11. To form two support feet 18, at least two protrusions 19 can be provided on the fixing side 7 of the support part 2. These two protrusions 19 can abut on the inside 3 of the covering 4 for the form-fit force introduction in the form-fit zone 11. Here, in each case one of the two protrusions 19 can be arranged on a side of the elevation 9, i.e., the first elevation 9*a* or the second elevation 9*b*. The elevation 9 or the first elevation 9*a* and/or the second elevation 9*b* can accordingly be arranged between the two at least protrusions 19 in a direction Y running on an actuation axis A of the door handle 6, cf. FIG. 1. In a mounted state of the vehicle door 1 on a motor vehicle, the direction Y runs vertically.

As shown by way of example in FIG. 2, several protrusions 19 can also be provided for forming several support feet 18 on the fixing side 7 of the support part 2. The protrusions 18 can be formed in a region of the support part 2 between the first elevation 9*a* and the second elevation 9*b*. The protrusions 19 can be arranged at a distance apart from one another in the direction Y.

According to FIG. 1, the elevation 9, i.e., the first and/or the second elevation 9*a*, 9*b*, of the support part 2 extends beyond an elevation height H. The elevation height H can expediently be measured in the direction of the door handle 6 away from the fixing side 7 of the support part 2. The elevation height H of the elevation 9 or the first and/or second elevation 9*a*, 9*b* of the support part 2 can be greater than or equal to a covering strength S of the covering 4. The covering strength S can correspond to a distance between the inside 3 and the outside 5 of the covering 4. The covering 4 can be a sheet made of metal or a plate-shaped object made of a plastic, preferably made of a fiber-reinforced plastic. A covering strength can accordingly be a sheet strength of the covering 4 or a plate strength of the covering 4.

The elevation 9 or the first and/or the second elevation 9*a*, 9*b* of the support part 2 is here tailored to the covering thickness S of the covering 4 in such a way that, in the vehicle door 1, the elevation 9 or the first and/or the second elevation 9*a*, 9*b* can be received across the entire covering thickness S of the covering 4 in the aperture 10 or the first and/or the second aperture 10*a*, 10*b*.

To form a grip positioning aid, a centering element can be present on the elevation 9 or on the first and/or second elevation 9*a*, 9*b*, by means of which centering element the outer door handle 6 can be centered in relation to the support part 2. Such a centering element 21 for forming a grip positioning aid 20 is not shown in the figures.

The vehicle door 1 shown in FIG. 1 is based, by way of example, on a modular construction system according to the invention for a vehicle door 1. Such a modular construction system for the vehicle door 1 comprises an outer door handle pool, which comprises a plurality of outer door handles 6. Moreover, the modular construction system has a covering pool which comprises a plurality of coverings 4. The modular construction system for the vehicle door 1 comprises a support part 2. Here, the modular construction system for the vehicle door 1 is arranged in such a way that each outer door handle 6 of the outer door handle pool can be fixed on the support part 2 for fixing on the support part 2 via a grip fixing interface 22 that is substantially the same for all outer door handles 6 of the outer door handle pool.

Each of the coverings 4 of the covering pool of the modular construction system has a substantially identical support part fixing interface 23. The support part 2 can be fixed on each covering 4 of the covering pool via this support part fixing interface 23. Thus, each individual door handle 6 of the outer door handle pool can be fixed on each individual covering 4 of the covering pool by forming the vehicle door 1 by means of the support part 2. The support part 2 thus serves to ensure that different kinds of coverings 4 of the covering pool can be combined with different outer door handles 6 of the outer door handle pool when forming the vehicle door 1. Here, the outer door handles 6 of the outer door handle pool can differ from one another—except for in relation to the uniform grip fixing interface 22—in all conceivable design freedoms. Similarly, the coverings 4 of the covering pool can differ—except in terms of the uniform support part fixing interface 23—in all conceivable design freedoms. Such design freedoms can be a shaping, a coloring, a material selection and/or similar.

The vehicle door 1 according to the invention shown by way of example in FIG. 1 is part of a motor vehicle according to the invention having a bodywork. This motor vehicle can comprise two vehicle doors 1 according to the invention. The motor vehicle can comprise four or five vehicle doors 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle door for a motor vehicle, the vehicle door comprising:

a covering of the vehicle door;

a support part arranged on an inside of the covering; and an outer door handle configured to actuate the vehicle door, wherein the outer door handle is arranged on an outside of the covering and fixed on the support part, wherein a first elevation is provided on the support part on a fixing side of the support part facing towards the covering to form a first positioning aid, wherein the first elevation is received in the vehicle door in a first aperture of the covering, the first aperture being tailored to the first elevation, wherein the support part and the covering are tailored to each other in such a way that they are connected to each other in a form-fit manner in at least one form fit zone, wherein a second elevation is provided on the support part on the fixing side of the support part facing towards the covering to form a second positioning aid, wherein the second elevation is received in the vehicle door in a second aperture tailored to the second elevation in the covering, wherein the first or second aperture in the covering comprises a slot section in which the support part is releasably fixed on the covering by a screw connection, wherein a screw receiver is provided on the first elevation of the support part to form the screw connection, wherein the second elevation includes a hook element having an undercut, wherein the hook element engages through the second aperture in such a way that the undercut abuts on the outside of the covering, and wherein the first or second elevation of the support part extends across an elevation height, which is greater than or equal to a distance between the inside of the covering and an outside of the covering, such that the first or second elevation is received across an entirety of the distance between the inside and outside of the covering in the first or second aperture.

2. The vehicle door of claim 1, wherein a protrusion is present on the fixing side of the support part to form a support foot, wherein the protrusion abuts on the inside of the covering for form fit force introduction in the form fit zone.

3. The vehicle door of claim 1, wherein at least two protrusions are provided on the fixing side of the support part to form two support feet, wherein the at least two protrusions abut on the inside of the covering for form-fit force introduction in the form fit zone, wherein the first or second elevation is arranged between the at least two protrusions in a direction running on an actuation axis of the outer door handle.

4. The vehicle door of claim 1, wherein a centering element is present on the first or second elevation to form a grip positioning aid, wherein the outer door handle is centered relative to the support part by the centering element.

5. A modular construction system for a vehicle door, the system comprising:

an outer door handle pool comprising a plurality of outer door handles;

a covering pool comprising a plurality of coverings; and a support part, wherein each outer door handle of the outer door handle pool is fixable on the support part for fixing on the support part via a grip fixing interface that is the same for all of the plurality of outer door handles of the outer door handle pool, wherein the support part is fixable on each of the coverings of the covering pool via a support part fixing interface that is the same for all coverings of the covering pool, such that each individual outer door handle of the outer door handle pool is fixable on each individual covering of the covering pool by forming the vehicle door by the support part, wherein a first elevation is provided on the support part on a fixing side of the support part facing towards one of the plurality of coverings to form a first positioning aid, wherein the first elevation is configured for receipt in the vehicle door in a first aperture of the covering, the first aperture being tailored to the first elevation, wherein the support part and the plurality of coverings are tailored to each other in such a way that they are connected to each other in a form-fit manner in at least one form fit zone, wherein a second elevation is provided on the support part on the fixing side of the support part facing towards one of the plurality of coverings to form a second positioning aid, wherein the second elevation configured for receipt in the vehicle door in a second aperture tailored to the second elevation in the covering, wherein the first or second aperture in the one of the plurality of coverings comprises a slot section in which the support part is releasably fixed on the one of the plurality of coverings by a screw connection, wherein a screw receiver is provided on the first elevation of the support part to form the screw connection, wherein the second elevation includes a hook element having an undercut, wherein the hook element engages through the second aperture in such a way that the undercut abuts on the outside of the one of the plurality of coverings, and wherein the first or second elevation of the support part extends across an elevation height, which is greater than or equal to a distance between the inside of the covering and an outside of the covering, such that the first or second elevation is received across an entirety of the distance between the inside and outside of the one of the plurality of coverings in the first or second aperture.

6. The modular construction system of claim 5, wherein a protrusion is present on the fixing side of the support part to form a support foot, wherein the protrusion abuts on the inside of the covering for form fit force introduction in the form fit zone.

7. The modular construction system of claim 5, wherein at least two protrusions are provided on the fixing side of the support part to form two support feet, wherein the at least two protrusions abut on the inside of the covering for form-fit force introduction in the form fit zone, wherein the first or second elevation is arranged between the at least two protrusions in a direction running on an actuation axis of the outer door handle.

8. The modular construction system of claim 5, wherein a centering element is present on the first or second elevation to form a grip positioning aid, wherein the outer door handle is centered relative to the support part by the centering element.

9. A motor vehicle, comprising:

a bodywork; and at least one vehicle door, which comprises a covering of the vehicle door;

a support part arranged on an inside of the covering; and an outer door handle configured to actuate the vehicle door, wherein the outer door handle is arranged on an outside of the covering and fixed on the support part, wherein a first elevation is provided on the support part on a fixing side of the support part facing towards the covering to form a first positioning aid, wherein the first elevation is received in the vehicle door in a first aperture of the covering, the first aperture being tailored to the first elevation, wherein the support part and the covering are tailored to each other in such a way that they are connected to each other in a form-fit manner in at least one form fit zone, wherein a second elevation is provided on the support part on the fixing side of the support part facing towards the covering to form a second positioning aid, wherein the second elevation is received in the vehicle door in a second aperture tailored to the second elevation in the covering, wherein the first or second aperture in the covering comprises a slot section in which the support part is releasably fixed on the covering by a screw connection, wherein a screw receiver is provided on the first elevation of the support part to form the screw connection, wherein the second elevation includes a hook element having an undercut, wherein the hook element engages through the second aperture in such a way that the undercut abuts on the outside of the covering, and wherein the first or second elevation of the support part extends across an elevation height, which is greater than or equal to a distance between the inside of the covering and an outside of the covering, such that the first or second elevation is received across an entirety of the distance between the inside and outside of the covering in the first or second aperture.

10. The motor vehicle of claim 9, wherein a protrusion is present on the fixing side of the support part to form a support foot, wherein the protrusion abuts on the inside of the covering for form fit force introduction in the form fit zone.

11. The motor vehicle of claim 9, wherein at least two protrusions are provided on the fixing side of the support part to form two support feet, wherein the at least two protrusions abut on the inside of the covering for form-fit force introduction in the form fit zone, wherein the first or second elevation is arranged between the at least two protrusions in a direction running on an actuation axis of the outer door handle.

12. The motor vehicle of claim 9, wherein a centering element is present on the first or second elevation to form a grip positioning aid, wherein the outer door handle is centered relative to the support part by the centering element.

* * * * *